United States Patent
Wohlgemuth

(10) Patent No.: US 6,966,764 B2
(45) Date of Patent: Nov. 22, 2005

(54) METHOD AND APPARATUS FOR POSITIONING A TOP BLOCK ASSEMBLY AND NECK FINISH COMPONENTS OF A BLOW MOLDING MACHINE

(75) Inventor: Emanuel E. Wohlgemuth, Condado, PR (US)

(73) Assignee: Ultraseal Technologies, Corporation, Worcester, MA (US)

( * ) Notice: Subject to any disclaimer, the term of this patent is extended or adjusted under 35 U.S.C. 154(b) by 260 days.

(21) Appl. No.: 10/354,350

(22) Filed: Jan. 30, 2003

(65) Prior Publication Data

US 2003/0146550 A1  Aug. 7, 2003

Related U.S. Application Data

(60) Provisional application No. 60/368,513, filed on Mar. 29, 2002, provisional application No. 60/354,558, filed on Feb. 5, 2002.

(51) Int. Cl.[7] .......................... B29C 49/50; B29C 49/76
(52) U.S. Cl. ...................... 425/168; 425/182; 425/195; 425/525; 425/527; 425/531
(58) Field of Search ................................ 425/168, 182, 425/195, 525, 527, 531, 535; 29/465, 525.11

(56) References Cited

U.S. PATENT DOCUMENTS

| | | | | |
|---|---|---|---|---|
| 3,843,286 A | * | 10/1974 | Horberg et al. | 425/526 |
| 5,256,055 A | | 10/1993 | Morris | 425/527 |
| 5,474,438 A | * | 12/1995 | Walker, Jr. | 425/185 |
| 5,496,166 A | * | 3/1996 | Vogel et al. | 425/451 |
| 5,585,121 A | | 12/1996 | Morris | 425/527 |
| 5,629,032 A | | 5/1997 | Pennino | 425/525 |
| 5,700,496 A | * | 12/1997 | Bacon | 425/193 |
| 5,776,518 A | | 7/1998 | Wohlgemuth | 425/525 |
| 5,894,024 A | | 4/1999 | Lambarth et al. | 425/525 |
| 6,468,456 B1 | * | 10/2002 | Webber et al. | 264/219 |

* cited by examiner

*Primary Examiner*—Robert B. Davis
(74) *Attorney, Agent, or Firm*—Hoffmann & Baron, LLP

(57) ABSTRACT

A top block assembly for a container blow mold system is provided together with a method of positioning the neck finish components of the assembly with respect to the front face of a top block half. A method and assembly for positioning a top block half with respect to a main mold half is further provided. The assembly for positioning the neck finish components includes a feeler gauge or spacer that is removably positioned between the top block half and the rear surfaces of the neck finish components. The positions of the neck finish components with respect to the front face of the top block half are adjusted by positioning a feeler gauge between the top block half and neck finish components. A heel is movably mounted to the top block half. A cam having flat surfaces is rotatably mounted to the top block half and engageable with the heel.

33 Claims, 11 Drawing Sheets

METHOD AND APPARATUS FOR POSITIONING A TOP BLOCK ASSEMBLY AND NECK FINISH COMPONENTS OF A BLOW MOLDING MACHINE

CROSS REFERENCE TO RELATED APPLICATIONS

This application claims the priority of U.S. provisional application Ser. No. 60/354,558 filed Feb. 5, 2002 and U.S. provisional application 60/368,513 filed Mar. 29, 2002.

FIELD OF THE INVENTION

This invention relates to a top block assembly for a container blow-mold system which facilitates proper alignment of components such as the top block half, master seal, shear steel and neck finish insert, and a method of positioning such components.

BACKGROUND OF THE INVENTION

The blow molding of plastic containers is well known and practiced worldwide. Blow-molding offers many advantages over other forms of container manufacturing.

Among these advantages are: the ability to produce containers at minimal cost and with minimal waste; the low start-up costs and mold making lead times in comparison to other manufacturing methods such as injection molding; the ability to produce irregular shaped and hollow containers; the ability to produce containers quickly and automatically; the ability to produce containers from a variety of materials having qualities suited to the specific application.

Blow-molded containers having specially formed neck finishes are commonly employed for use with container closures. Neck finishes may be threaded for use with threaded closures, adapted for mating with snap-on closures, etc. It is common within a container blow-mold system to employ a main mold to form the container reservoir, and a neck block, or top block, to form the neck finish. Top blocks are also made to standard dimensions so that the parting face of the top block and main mold properly match. The main mold is usually adapted to interchangeably accept any standard top block for a particular container size or style. Top blocks and main molds are often aligned visually by being loosely engaged, tapped into alignment with a mallet, then firmly affixed together. The back side of each mold half, and the back side, or heel, of each top block, are affixed to a planar mounting or back plate. Such tapping and rigid engagement, usually by steel bolts driven into threaded holes in the main mold, may cause damage and wear to the mold system, particularly when performed repeatedly as is common. Provided that the depth of the main mold half, from its parting face to its back side, is exactly equal to the depth of the top block half, from its parting face to its heel, the mold system can be properly aligned and effective molding can be performed therein. It is important to maintain this alignment.

The first pair of components mounted to the top block are the neck finish blocks. Each neck finish block is usually made of aluminum, and may originally be formed as a circular body. The circular body is cut in half to form the neck finish block for each half of the mold. The neck finish blocks are machined to provide threads, ratchet teeth, shoulders or other surface features on the container which are used to engage or otherwise accommodate a closure.

During blow-molding, a parison of molten plastic is extruded between the open mold halves, then the mold system closes to entrap the parison within the mold cavity. A hollow blow pin is inserted through the neck opening, and into the parison where it inflates the parison with pressurized air to cause the parison to form to the shape of the container and neck finish cavity. The blow pin includes a hardened steel bushing, or shear bushing, having an annular blade, and each top block half includes a semi-circular hardened steel blade, or shear steel.

The shear steel shapes and trims flash from the top end of the bottle neck. By providing various degrees of precision ground undercut to the bottom surfaces of the shear steels, a distinct radius can be formed at the upper edge of the bottle neck area. This can improve the strength of the bottle neck in this critical area. Shear steels are generally made of precision ground and hardened steel.

When the mold is closed, the semi-circular blades and seals form annular orifices around the shear bushing. During molding, portions of the parison extending beyond the mold cavity are trapped between the paring faces of the mold halves and become unwanted flash. After the container is formed within the cavity and before the mold system reopens to release the blow-molded container, the shear bushing is retracted through the shear steel orifice. The shear bushing and shear steels are sized and shaped so that the retraction causes a shearing of the container opening through the neck, whose diameter is that of the shear bushing blade and shear steel orifice. After the mold container is removed form the mold, flash is removed by trimming in an automated process.

The last set of components which are mounted to the top block are the master seals, which are sometimes referred to as masters. These components provide a seal for the blow pin, thereby preventing air from escaping from the mold when the parison is inflated to form the container. They also form a "flash pocket" which pinches and seals the parison when the molds close at the start of the production cycle.

When all neck finish components, i.e. the neck finish block, the shear steel and the master seal, have been mounted to the top block halves, they are then typically secured thereto with four Allen cap screws. All neck finish components are aligned as closely as possible with the mold parting line. Failure to do so can prevent the mold from closing properly, leading to damage or even destruction of the neck finish components and/or blow pin.

Misalignment of the main mold and top block parting faces can result in other problems during attempted molding. In addition to damaging the neck finish component, unusual and hastened wear of the parting faces, excessive and untrimmable molding flash, concentrated and extreme pressures on areas of the mold and improper shearing of the container opening may occur.

The neck finish components are often the most detailed components of the mold system, having many features and requiring the highest degree of accuracy in manufacture. For instance, the mating halves of threaded neck finish blocks must match precisely and prevent mold flash to ensure that the container closure will properly fit onto the neck and seal the container opening. Interchangeable mold inserts are commonly employed within the top blocks to simplify and reduce the cost and time of making changes to the neck finish type. As a result, it is not so common to recondition or repair the top block itself as it is to recondition or repair a main mold which generally includes an integral cavity. This fact creates a problem and burden when main mold reconditioning or repair is required. Because the main mold depth will be reduced by such maintenance, the top block must also be reworked only to maintain an equal depth as the main mold, for proper alignment thereafter, or else a relief pocket must be precisely cut into the back plate to accommodate the new position of the top block's tail end. This is a costly and time consuming process.

Some of the disadvantages of conventional blow molding assemblies have been addressed. U.S. Pat. No. 5,776,518 discloses a top block assembly which allows alignment of the parting faces of the top block and/or neck finish components thereof with the parting face of the main mold. A method of providing such alignment is also disclosed. The disclosure of this patent is incorporated by reference herein.

The top block assembly according to the patent includes a top block including a neck finish portion and a rotatable cam. The cam bears against the forward face of a movable heel. It may alternatively bear against the neck finish components, namely the neck finish block, the shear steel and the master seal. The top block assembly is mountable to a main mold. By rotating the cam, a front surface of the top block can be aligned with a front surface of the main mold.

An assembly employing wedges to adjust the positions of neck finish inserts is disclosed in U.S. Pat. No. 5,894,024. The wedges are caused to move axially within guide slots by advancing or retracting screws.

U.S. Pat. No. 5,585,121 discloses a blow molding assembly that employs a screw having a cam head for positioning the shear steel and/or master seal. Movement of the shear steel towards the axis of the blow molding station is said to take up wear that has occurred in the shear steel.

SUMMARY OF THE INVENTION

A top block assembly is provided that allows adjustment of the positions of the neck finish components to reduce or eliminate fuzz or roughness in the neck portion of a blown container made with the top block assembly. By providing a top block assembly in which the neck finish components can be precisely aligned, wear on the neck finish components as well as other parts of the molding assembly can be greatly reduced. A method of positioning the neck finish components with respect to a top block half is also provided. The method allows the positioning of the components with respect to the front face of the top block half with great precision.

In accordance with the invention, a top block assembly is provided that includes a top block half having a front face, a cavity adjoining the front face, a shoulder extending into the cavity, a top surface and a recess extending from the top surface towards the shoulder. A plurality of neck finish components are coupled to the shoulder and extend within the cavity. The neck finish components have rear surfaces adjoining the recess and, with the recess, define a closed slot having an open top end intersecting the top surface of the top block half. A feeler gauge is removably positioned within the slot and has an inner surface engaging the top block half and an outer surface engaging the rear surfaces of the neck finish components. In one embodiment of the invention, the feeler gauge extends above the neck finish components to facilitate its removal. Once the connections between the neck finish components and top block half are loosened, the user can simply grasp the projecting upper end of the feeler gauge to remove it. The feeler gauge can be replaced with a feeler gauge of different thickness. When the neck finish components have been satisfactorily aligned with the front face of the top block half, a feeler gauge is employed that preferably is of such a length that it would not extend above the neck finish components.

In further accordance with the invention, a top block assembly for a molding apparatus is provided that includes a top block half, neck finish components coupled to the top block half and a removable spacer abutting the top block half and the rear surface portions of the neck finish components. The top block half includes a front face, a cavity adjoining the front face and a substantially flat surface within the cavity. The neck finish components are positioned within the cavity. Each of the neck finish components includes a substantially flat rear surface portion that is in opposing relation to the substantially flat surface within the cavity. The spacer has a portion of substantially uniform thickness abutting the substantially flat surface of the top block half as well as the substantially flat rear surface portions of the neck finish components. The top block assembly preferably includes a substantially vertically extending recess of substantially uniform depth such that a closed slot having a top opening is defined by the recess and the substantially flat rear surface portions of the neck finish components.

A method of positioning neck finish components with respect to a top block half is further provided. The top block half includes a cavity, a recess extending substantially vertically within the cavity, and the neck finish components include substantially flat rear surface portions. The method includes mounting the neck finish components to the top block half such that the components extend within the cavity and the substantially flat rear surface portions of the neck finish components are in opposing relation to the recess, thereby defining a substantially vertically extending, closed slot having an open top end. The method further includes the step of inserting a first feeler gauge through the open top end and into the slot such that the feeler gauge engages and positions the neck finish components with respect to the front face of the top block half.

In further accordance with the invention, a method of adjusting the positions of neck finish components with respect to the front face of a top block half is provided that comprises mounting the neck finish components to the top block half, positioning a first feeler gauge between the neck finish components and the top block half, and causing the first feeler gauge to the engage the top block half and the neck finish components such that the neck finish components are maintained in a first position with respect to the front face of the top block half.

A top block assembly that reliably maintains the position of a top block half with respect to the parting face of a main mold half is further provided. The assembly includes a top block half, a heel, and a rotatable cam positioned between the top block half and the heel. The cam includes a plurality of flat surfaces and engages the heel, thereby maintaining the top block half in a fixed position with respect to the main mold half and back plate. In order to provide additional stability, a shim is provided on each side of the cam. The shims engage the heel and top block. Such shims can be employed whether the cam has flat surfaces or is smoothly curved.

A method of setting the position of a top block half and the associated neck finish components with respect to the parting face of a main mold half is also provided. The top block half and the heel are mounted to a main mold half. The heel is moved towards a back plate, causing a gap or space to form (or widen) between the heel and top block half. One or more shims are then positioned within the gap. The shims engage the heel and top block half, thereby preventing relative movement between them. A cam is preferably employed to move the heel, and preferably includes a plurality of flat surfaces.

DETAILED DESCRIPTION OF THE INVENTION

Figure 1:
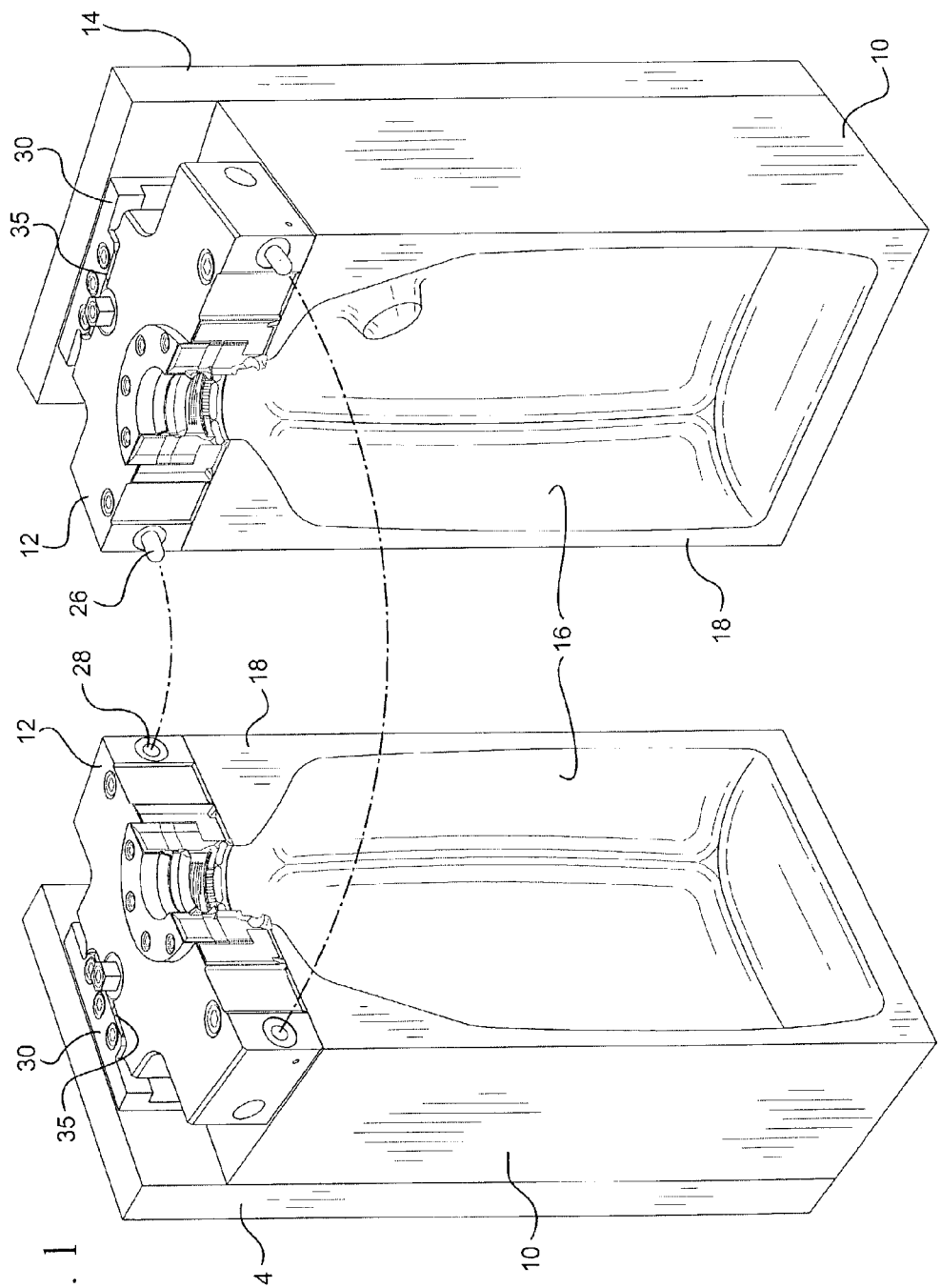
FIG. 1 is a perspective view showing two mold halves.

There is shown in the drawings and described below in detail preferred embodiments of the invention with the understanding that the present disclosure is to be considered as exemplary of the principles of the invention and is not intended to limit the invention to the embodiments illustrated.

A preferred embodiment of the invention is described herein. Referring to FIG. 1, an assembly for blow molding containers is shown. The assembly is comprised of two mail mold halves 10, two top block halves 12, and two back plates 14. Each main mold half 10 is secured to one of the back plates. The back plates are incorporated in a molding machine (not shown) capable of introducing a parison between the mold halves, closing the mold halves, inflating the parison, and opening the mold halves to release the container formed therein. The top block halves 12 are affixed to the main mold halves by machine bolts. Each main mold half 10 includes a cavity 16 in which a parison can be inflated. The cavities adjoin the parting faces 18 of the main mold halves.

Figure 2:
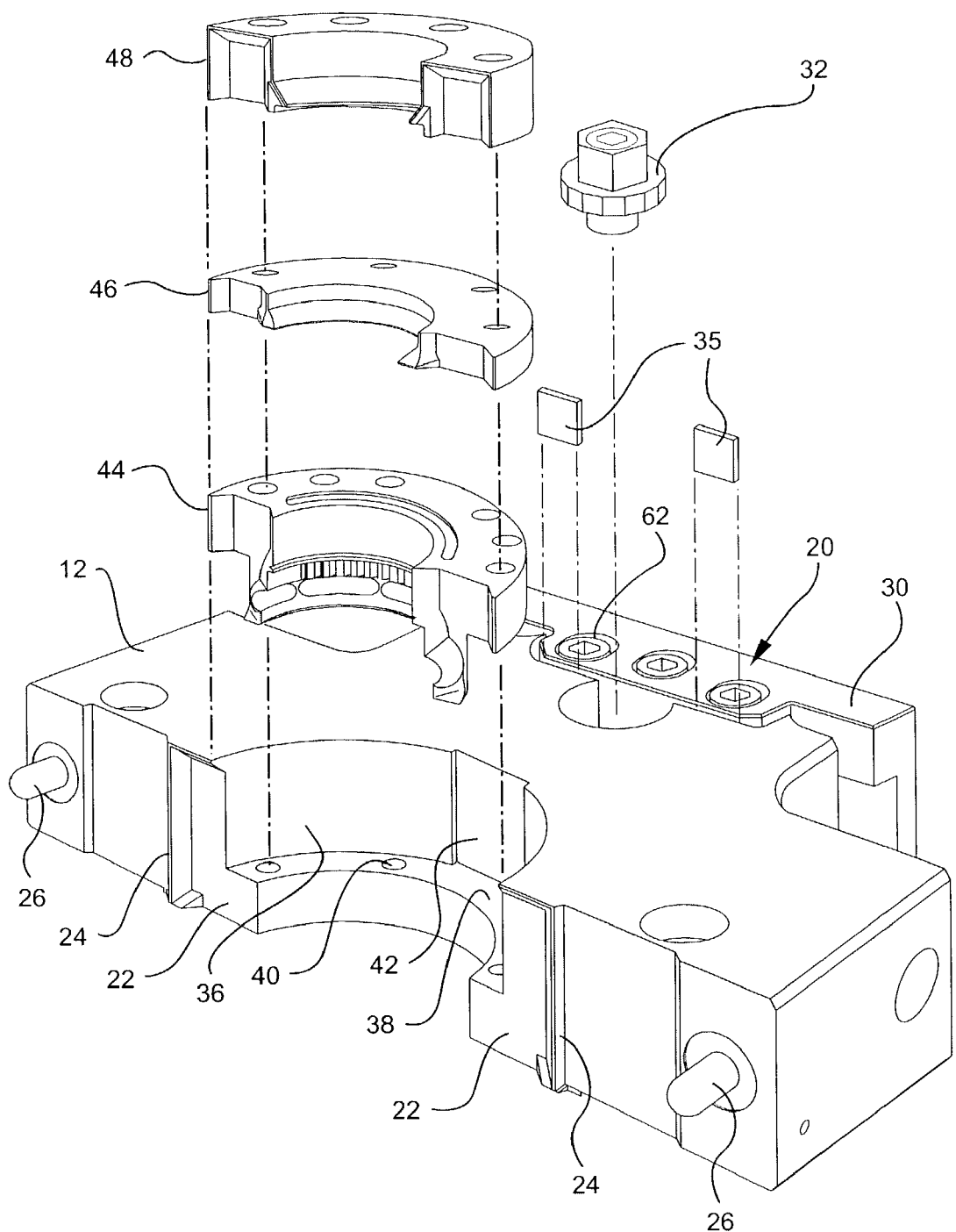
FIG. 2 is an exploded front perspective view of a top block assembly according to the invention.
Figure 3:
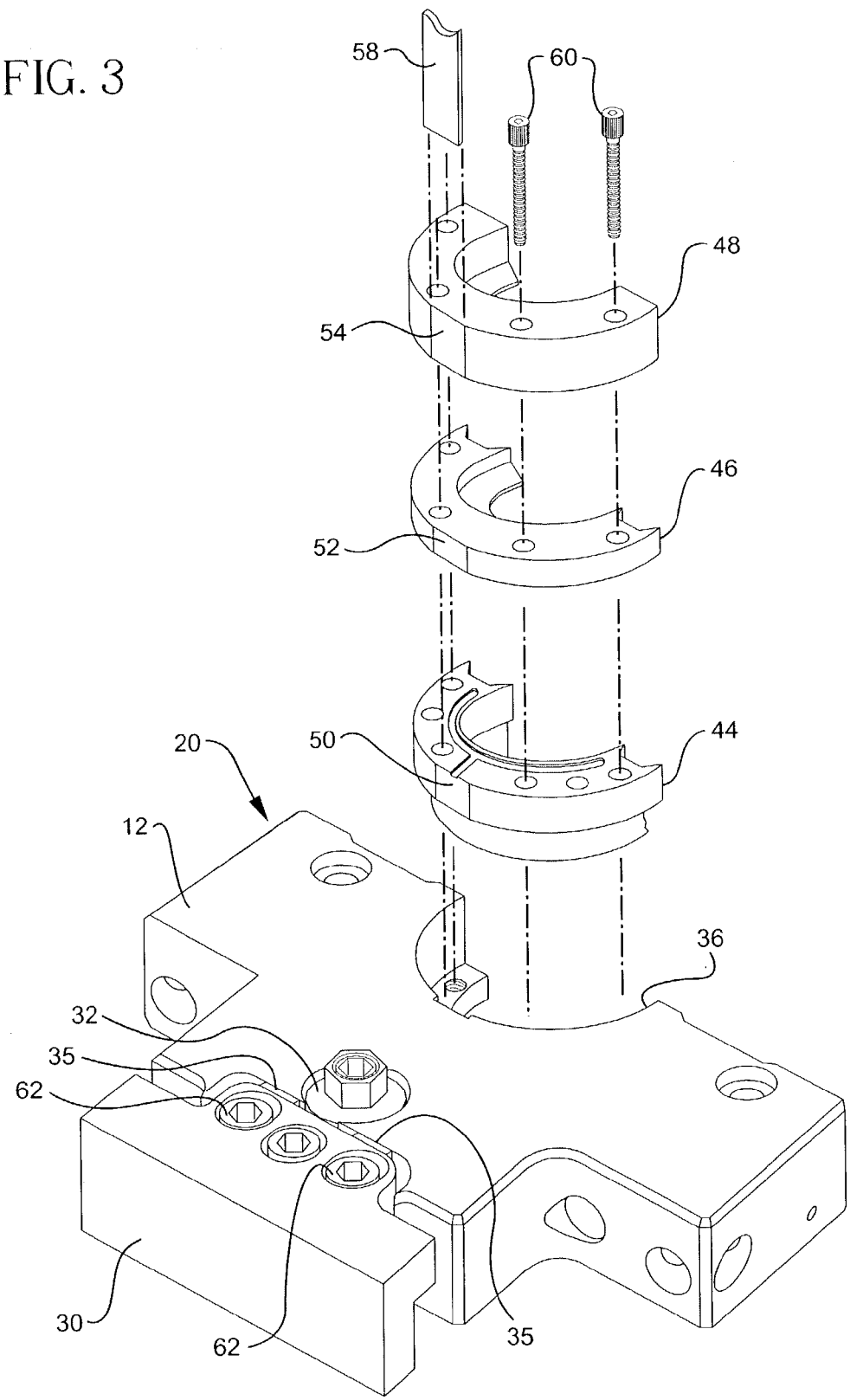
FIG. 3 is an exploded, rear perspective view thereof showing a step in the alignment thereof.
Figure 4:
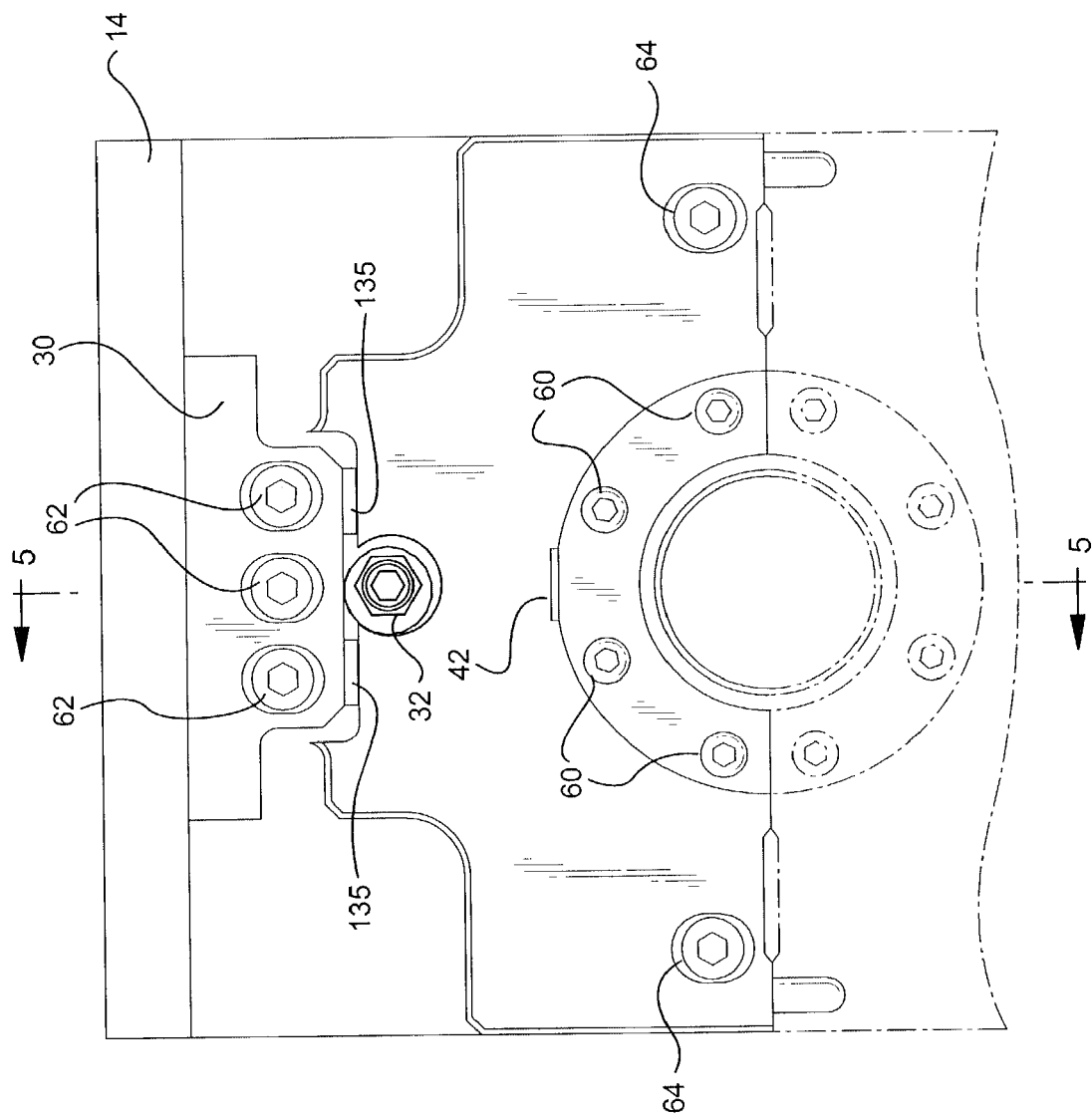
FIG. 4 is a top view plan thereof.

The top block halves form parts of the top block assemblies 20 for molding the neck portions of containers. A top block assembly in accordance with a preferred embodiment of the invention is shown in FIGS. 2–4. The front face of the top block half 12 shown in these figures includes a pair of flash pockets 22. The outer edge of each flash pocket adjoins an elongate, vertically extending protrusion 24. The protrusion is substantially triangular in cross section, and is referred to as a pinch-off. The portions of the top block half outside each pinch-off are known as tonnage pad sections. In this preferred embodiment, a male alignment pin 26 extends from each tonnage pad section of one of the top block halves. Each pin may be made from case hardened steel. The ends of the pins are preferably rounded. The tonnage pad sections of the opposing top block half each include a steel bushing 28 located in a hollow bore. When the mold is closed, the pins enter the bushings, thereby ensuring that the top block halves and associated components are correctly aligned vertically and horizontally. While preferred, the use of such pins and bushings is not essential to the successful practice of the invention, as described below.

Alignment of the top block halves and associated components with respect to the main mold halves is a preferred feature. A moveable heel 30 is accordingly attached to each top block half. The forward face of the heel engages a rotatable eccentric cam nut 32. Rotation of the cam nut allows translational movement of the heel 30. Such movement causes a variation in the top block assembly depth as measured from the tail face of the heel to the front faces of the top block half and associated components. The upwardly projecting nut portion of the cam nut may be hexagonal as shown to allow it to be rotated or affixed in position by a wrench. A bolt 34 extending through the cam nut and into the top block half allows rotation of the cam nut when the screw is loosened, and prevents such rotation when tightened.

The outer surface of the cam portion of the cam nut is preferably comprised of a plurality of flat surfaces 33. The flat surfaces help prevent the cam nut from backing off under load. Eighteen such surfaces are provided in the cam nuts 32, 132 shown in FIGS. 8–9 and 10–11, respectively. Shims 35 are positioned between the rear surface of the top block half 12 and the front surface of the heel 30 to maintain the heel/top block spacing, and thereby maintain the relative positions of the top block half and main mold half. The shims are effective even if the cam nut loosens over time, thereby allowing the manufacture of "fuzz" free neck finishes for long periods of time.

Each top block half 12 includes a cavity 36 that communicates with the cavity 16 in the adjoining main mold half. A shelf 38 extends into the cavity, and openings 40 extending therein. The cavity 36 and shelf 38 are both bounded by generally semicylindrical front face portions in the top block half 12 shown in FIG. 2. A recess in the form of a substantially vertical slot 42 is provided in the front face portion of one of the top block halves, preferably at the midpoint thereof. The slot 42 extends between the top surface of the top block half and the shelf 38. The face portion of the top block half is substantially flat between the opposing walls of the slot.

Neck finish components are mounted to each top block half, and are supported by the respective shelves. The neck finish components include a neck finish insert 44, a shear steel 46, and a master seal 48. These components are formed separately in the preferred embodiment of the invention. The rear surfaces of the neck finish components are generally semicylindrical where they adjoin the top block half. As shown in FIG. 3, a flat is formed on the rear surface of each component that overlies the slot 42. The flats are preferably positioned at the midpoint of these rear surfaces. The flats are designated by numerals 50, 52 and 54, respectively. When the neck finish components are mounted to the one top block half, the slot 42 is effectively closed except for a top opening. The flats 50, 52, 54 are each substantially parallel to the substantially flat surface of the slot 42. Both the flats 50, 52, 54 and the slot surface are substantially vertical, and are accordingly substantially perpendicular to the top surface of the top block half. The neck finish components mounted to the other top block half do not require flats. (It will be understood that the "flat" surfaces may include grooves and/or other surface irregularities so long as they provide substantially planar surface portions that can abut a spacer or feeler gauge as described below.)

It is important for all elements of the molding assembly to be properly aligned during the molding process. Such alignment helps ensure that the containers are properly formed within the molding assembly. It further helps prevent any of the top block components from being damaged when the molding assembly is closed. The alignment should be maintained as the mold assembly repeatedly opens and closes during use and the blow pin 56 moves up and down between the neck finish components. A spacer 58 having a specific thickness is accordingly positioned within the slot 42. The thickness of the spacer employed is determined by operating the mold with the neck finish components in place, as described below. One end of the spacer 58 may be tapered to facilitate its insertion within the slot. The spacer is otherwise preferably of substantially uniform thickness. It accordingly has a front surface that abuts the flats 50, 52, 54 on all neck finish components and a rear surface that abuts the front face of the top block half between the opposing walls of the slot 42. The width of the spacer is substantially the same as the width of the slot.

In the preferred embodiment of the invention, the rear top block half includes the bushings 28 while the front top block half includes the alignment pins 26. Installation of the top block assemblies preferably begins with mounting the neck finish insert 44, the shear steel 46 and the master seal 48 to the rear top block half. Holding screws 60 (shown in FIG. 3 as used in the front top block half) are moved through the openings in the neck finish components and into the threaded openings 40 in the shelf 38. The screws are slightly tightened. The heel adjusting bolts 62 are loosened, and the top of the main mold half and backplate 14 are cleaned. The rear top block half is mounted to the top of the rear main mold half and the top block mounting bolts 64 are slightly tightened. The heel 30 associated with the rear top block half should not contact the mold back plate 14. The tonnage pad sections of the rear top block are aligned flush with the face of the rear main mold half, and the two front top mounting bolts are tightened. The cam nut 32 is rotated until the heel 30 abuts the back plate 14. The cam securing bolt 34 is tightened, followed by the top block mounting bolt located directly behind the cam. The two heel adjusting bolts 62 are then tightened. The operator should then verify that the tonnage pad sections are indeed flush with the main mold half face. If not, the appropriate bolts should be loosened and the above procedure repeated.

Figure 5:
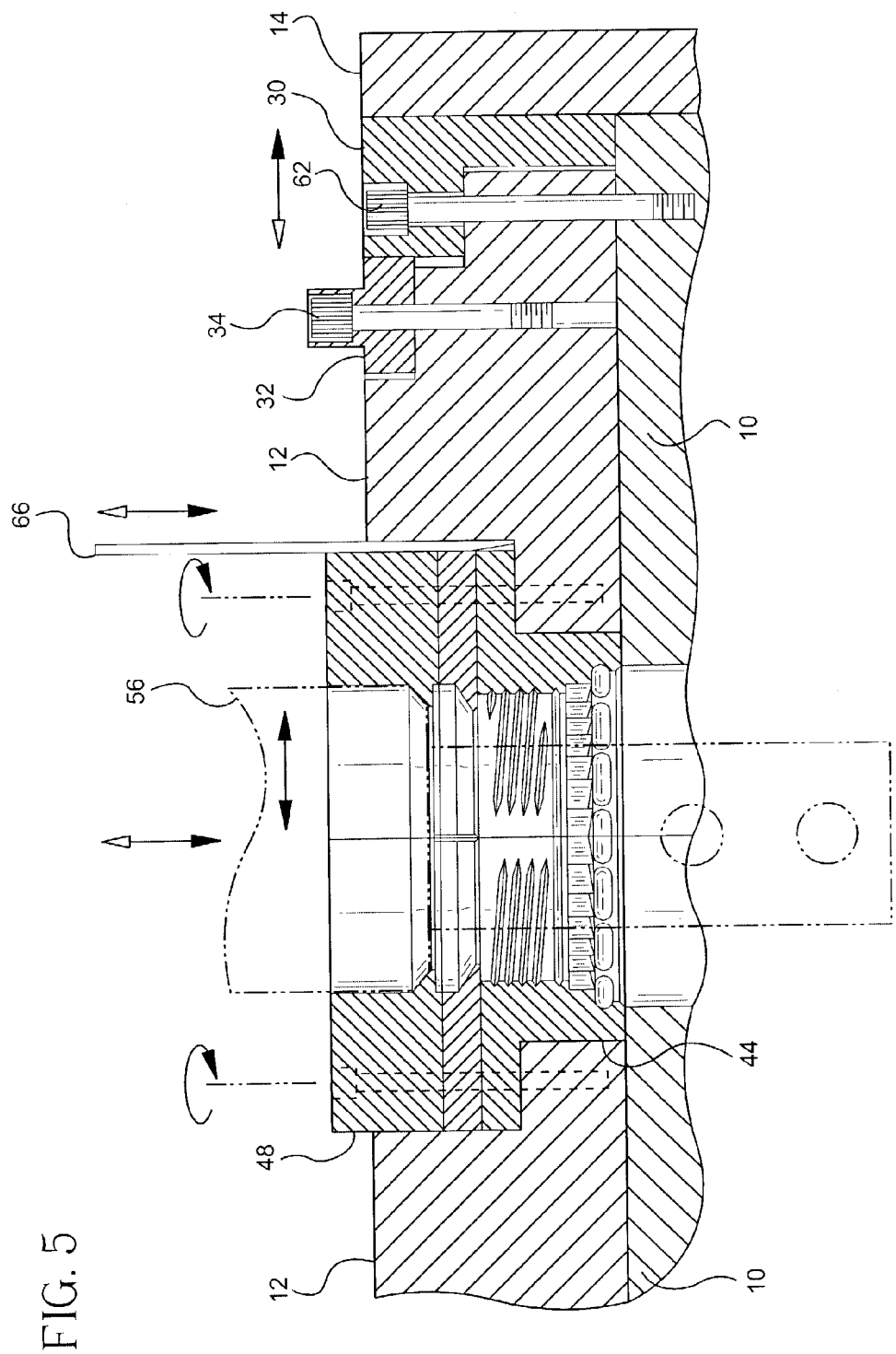
FIG. 5 is a sectional view taken along line 5—5 of FIG. 4.

Installation of the front top block half begins with loosening all moveable heel adjustment bolts 62 if necessary. The top of the main mold half and back plate are cleaned thoroughly, and any O rings used in the assembly are checked to ensure they are in place and seated properly. The neck finish insert 44, shear steel 46 and master seal 48 are mounted to the front top block half, and the holding screws 60 tightened slightly. The front top block half is then installed on the top of the front main mold half. The top block mounting bolts are inserted in the appropriate openings, and the front top block half is pushed forward as far as possible. The top block mounting bolts are then slightly tightened. The heel 30 should not be in contact with the mold back plate 14 at this point in time. The blow pin head (not shown) is set to a proper height. The mold is closed, and the blow pin 56 is driven to the down position. The rear top block half mounting bolt is then tightened securely. The mold is opened and the two front top block half mounting bolts are tightened securely. If the front top block half tonnage pad sections are not evenly set back from the face of the associated main mold half, the above procedure should be repeated. If the tonnage pads are evenly set back, the rear top block mounting bolt is loosened and the cam nut is rotated until the heel is tight against the back plate. The remaining bolts are then tightened, preferably in the following order: the cam securing bolt, the rear top block half bolt located directly behind the cam, and the heel adjusting bolts. As shown in FIG. 5, a feeler gauge 66 is inserted in the slot 42 between the top block half and the flats 50, 52 and 54 of the neck finish components. (In a preferred embodiment, the feeler gauge has a thickness of about 0.045 inches while the slot has a substantially uniform depth of about 0.032 inches.) The feeler gauge should be pushed all the way down until it contacts the upper surface of the shelf 38. With the feeler gauge in place, the holding screws 60 are tightened slightly. The feeler gauge is removed, and the two rear holding screws 60 are tightened. (The feeler gauge extends well above the top surface of the master seal, thereby facilitating its removal.) The mold is closed and the blow pin 56 is driven down. The mold is then opened and the blow pin returned to the up position. While holding the mold close button (not shown), the blow pin is driven down and the mold close button released. The mold is opened and the blow pin returned to the up position. The holding screws are then tightened securely.

Figure 6:
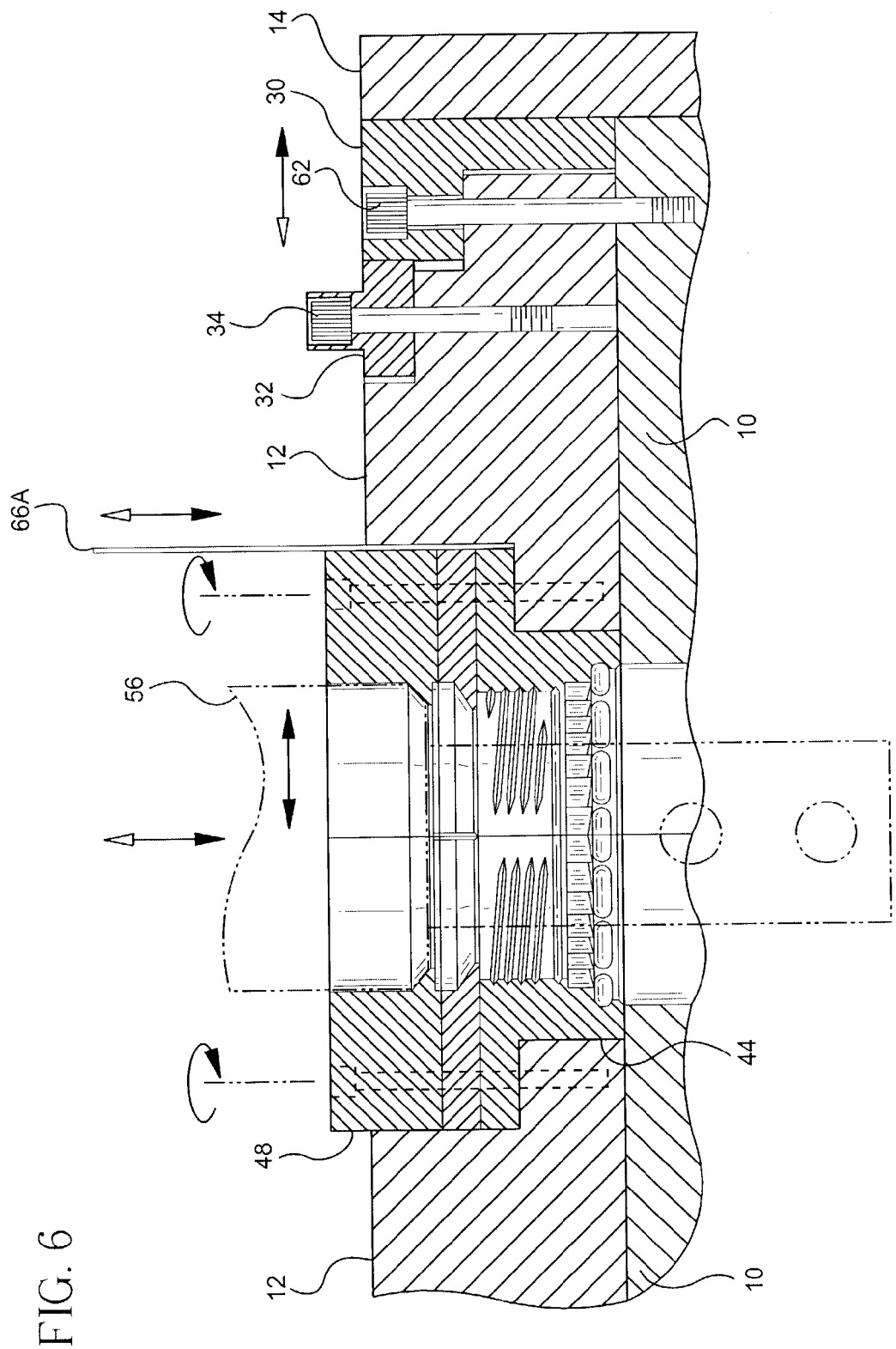
FIG. 6 is a sectional view thereof showing a further step in the alignment of the top block assembly components.
Figure 7:
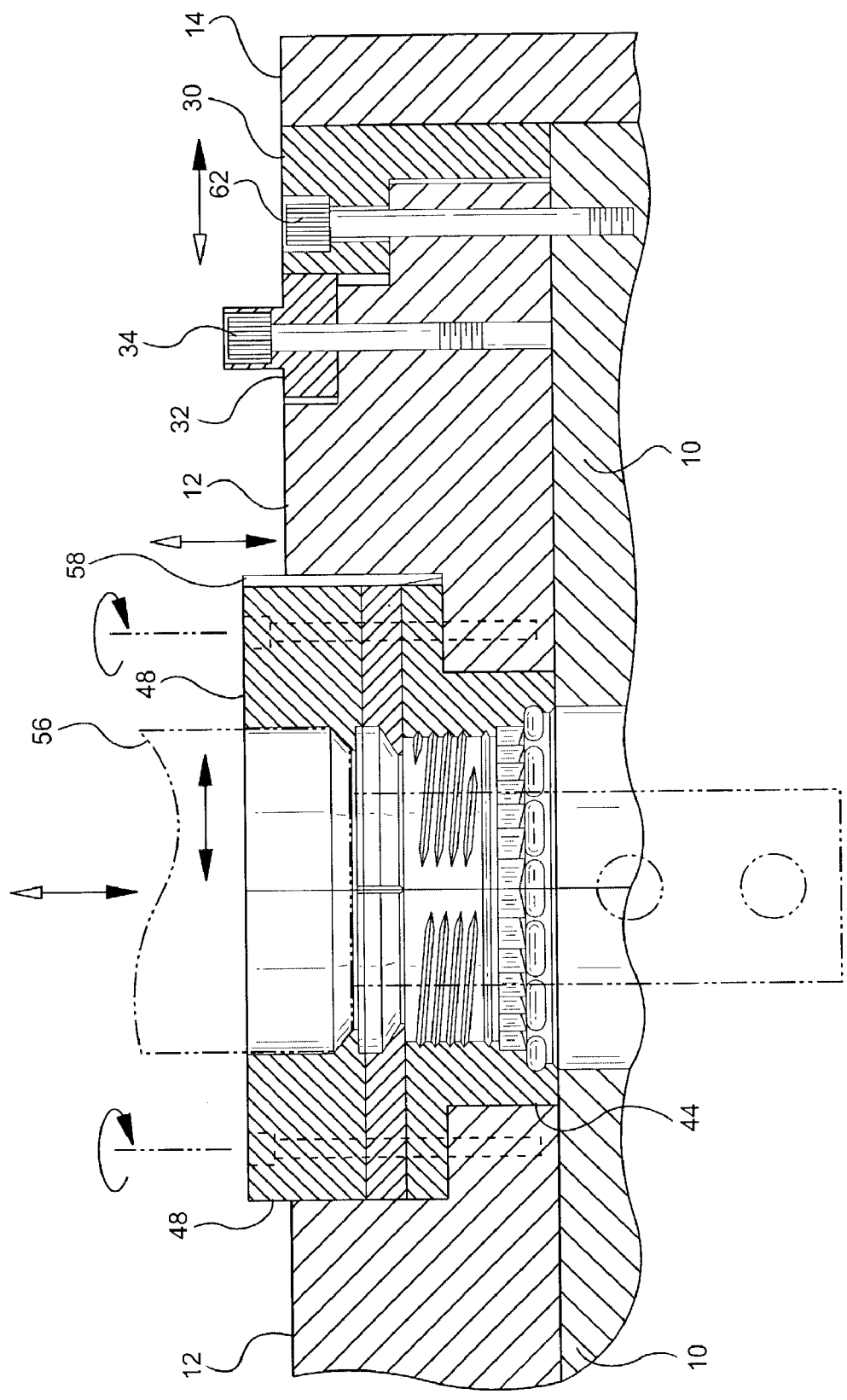
FIG. 7 is a sectional view thereof showing the top block assembly following alignment of the component parts thereof and ready for use.
Figure 8:
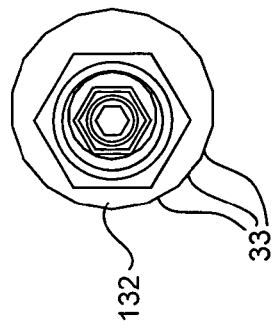
FIG. 8 is a top plan view of a cam/nut assembly for adjusting the relative positions of a top block half and heel.
Figure 9:
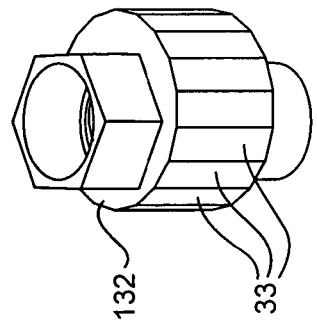
FIG. 9 is a top perspective view thereof.
Figure 10:
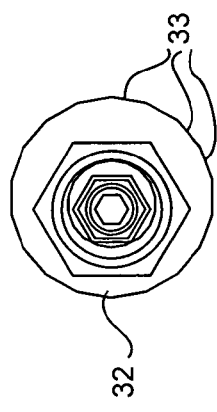
FIG. 10 is a top plan view of a second cam/nut assembly for adjusting the relative positions of a top block half and heel.
Figure 11:
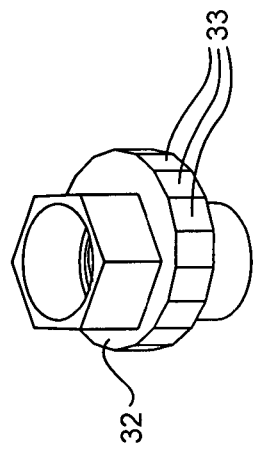
FIG. 11 is a top perspective view thereof.

As shown in FIG. 6, the largest feeler gauge 66A that will fit within the slot 42 is then inserted into the slot until it engages the shelf 38. The feeler gauge 66A is removed and the holding screws 60 are loosened. The feeler gauge is replaced with a feeler gauge that is slightly larger (e.g. 0.001 inch larger) than the feeler gauge previously used. (The feeler gauges preferably include indicia or other markings representing the thickness thereof) As shown in FIG. 7, this feeler gauge or spacer 58 is precut such that, when fully inserted, it is positioned at or below the top surface of the master seal 48. All four holding screws 60 are then slightly tightened. The "mold" button is pushed and held, and the blow pin 56 driven down. The mold is again opened and the blow pin 56 returned to the up position. All four holding screws 60 are then tightened. The molding machine is then ready to run.

After about 24 hours of machine run time, the cam nuts 32 associated with the front and rear top block halves are reset and retightened. The container openings formed by the neck finish components are inspected for fuzz or roughness. If such fuzz or roughness is observed, the feeler gauge or spacer 58 would be replaced with the next larger size, preferably progressing in 0.001 inch increments (e.g., 0.033 to 0.034 inches). The mold close button is held after installing the next size feeler gauge or spacer and the blow pin driven down. If difficulty is encountered in driving down the blow pin, the molding machine should not be run, and the shear steel should be replaced. If the blow pin functions normally, the molding machine is again run and the container necks inspected for fuzz or roughness. If such conditions persist, a slightly larger spacer would be employed.

In order to facilitate the above procedures, the mold operator is provided with a plurality of feeler gauges and spacers having a range of thicknesses. The feeler gauges and spacers have thickness exceeding the depth of the slot, and will accordingly engage the flats ground on the neck finish components as well as the flat surface of the top block half within the slot. The method and system described above allow the precise alignment of top block components. This in turn allows the production of container neck finishes that are substantially free of fuzz or other roughness and that will provide a substantially leak proof seal when capped. The system and method further ensure that wear on the blow pin and top block components is reduced to very low levels. The resulting molding machine can accordingly be run for extended periods of time without requiring maintenance.

The shims 35 and cam nut 32 or 132 provide for the relatively rough adjustment of the positions of the top block and associated neck finish components while the spacers 58 allow the relatively fine adjustment of the positions of the neck finish components. Feeler gauges, like those 66, 66A used to position the neck finish components, may be used to measure the gap between the top block half and heel. Shims 35 corresponding in thickness to the measured gap are positioned in this gap.

The ability to prevent movement of the top block halves over time is important in the manufacture of consistent "fuzz" free plastic bottles. The use of the primary rough adjustment and secondary fine adjustment features as discussed above allows the manufacture of such bottles for long periods of time.

It will be appreciated that the system and method according to the invention can be used with various top block assemblies and associated top block components capable of making many different types and sizes of plastic containers and neck finishes. FIGS. 8–9 and 10–11, for example, show different cam nut configurations that can be used in connection with two different top block assemblies, the first for use with an assembly for making one gallon containers, the second intended for use in making half gallon containers.

Figure 12:
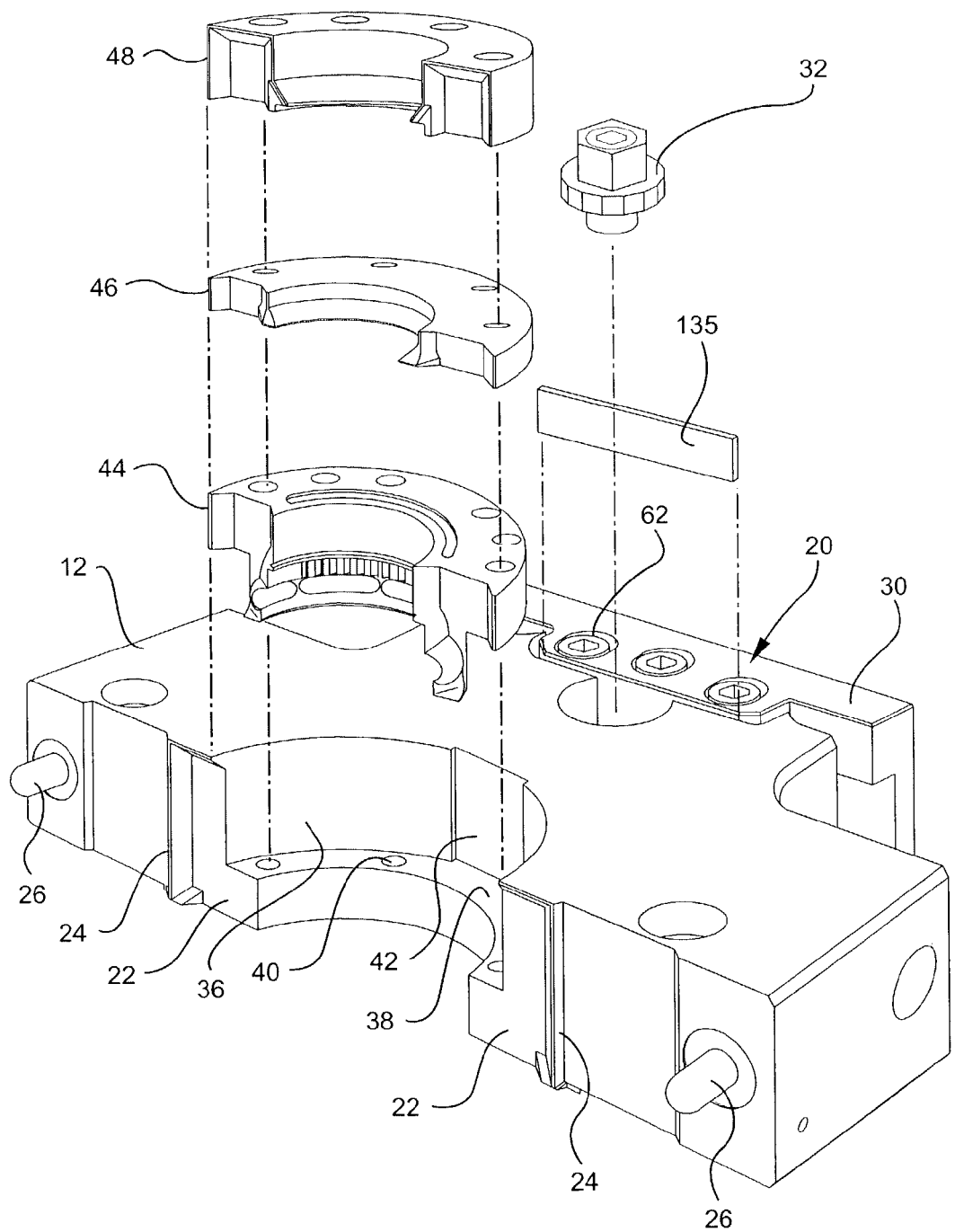
FIG. 12 is an exploded front perspective view of a top block assembly according to a second embodiment of the invention.
Figure 13:
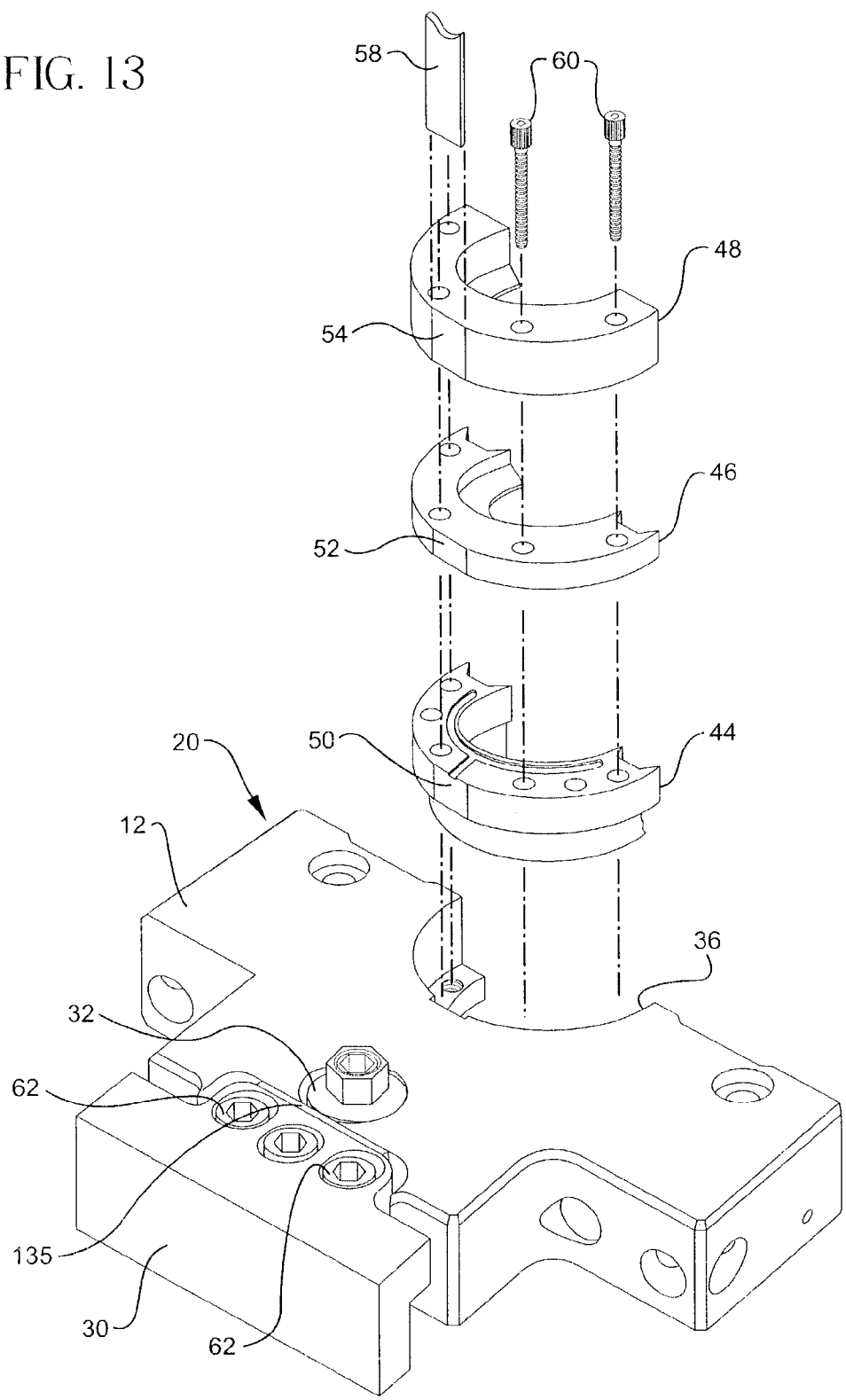
FIG. 13 is an exploded, rear perspective view thereof showing a step in the alignment thereof.
Figure 14:
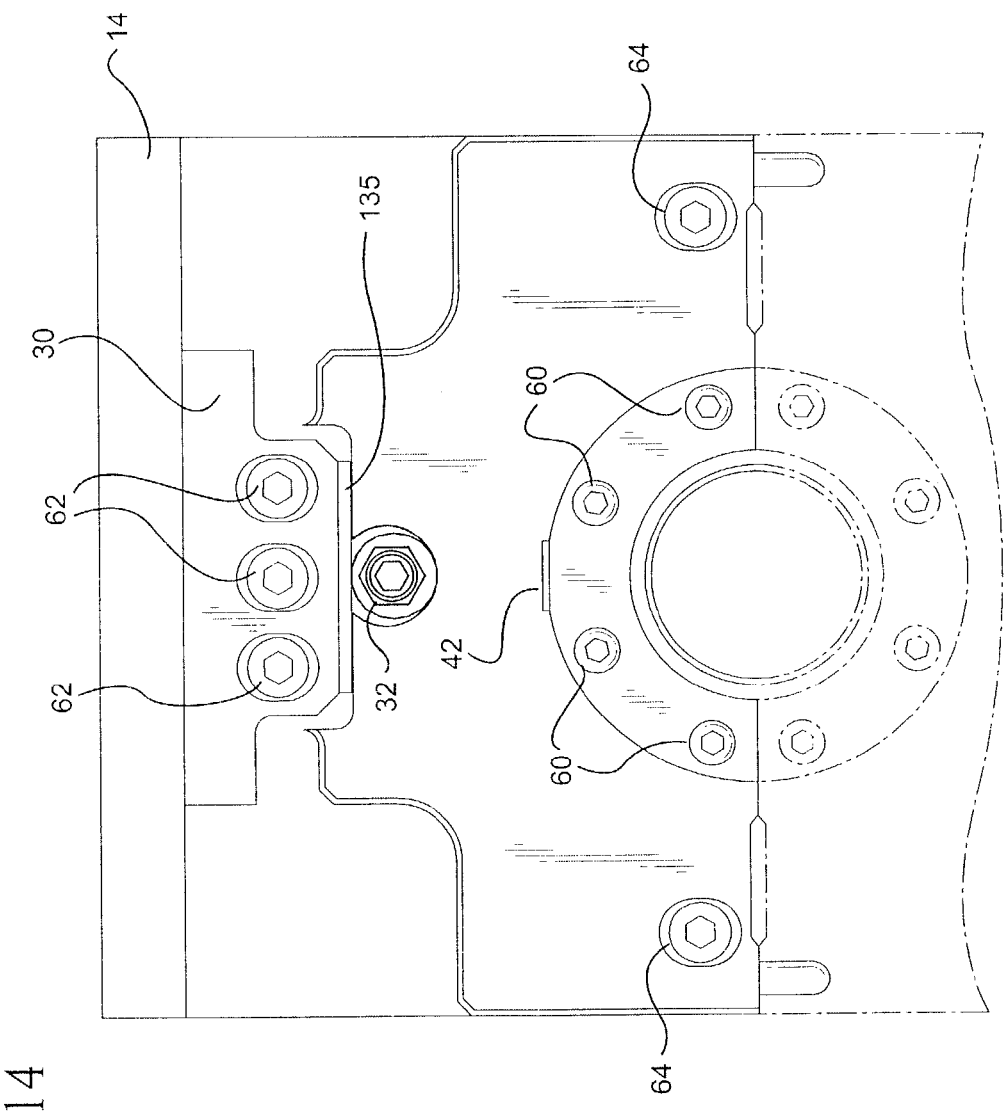
FIG. 14 is a top plan view thereof.

A second embodiment of the invention is shown in FIGS. 12–14. It is similar to the embodiment of FIGS. 1–7 except that a single shim 135 is employed and the cam 32 only engages the heel 30 during the relatively "rough" adjustment of the top block half with respect to the main mold half. The same reference numerals are accordingly employed to designate elements found in FIGS. 1–7.

As in the first embodiment, the cam 32 is rotated to cause the heel 30 to move towards the back plate. Because the cam has flat surfaces 33, the heel moves in discrete increments with respect to the top block half. Once the tonnage pad sections are aligned with the face of the main mold half and the heel engages the back plate 14, the space between the tail face of the top block half and the front face of the heel can be measured. The cam 32 can then be rotated out of engagement with the heel 30 and an appropriate shim 135 moved into the space between the top block half and heel. The cam can also engage the shim 135 as shown in FIGS. 13–14, though such engagement is not essential.

The flat surfaces 33 of the cam are preferably equal in size such that the heel moves in equal increments as the cam is rotated. Each increment can correspond to a shim of selected thickness. One servicing the mold accordingly can determine which size shim to choose based on the number of discrete increments that the heel has been caused to move away from the top block. The heel can initially contact the top block half, then be incrementally moved until the rough alignment process is completed and the heel is tight against the back plate. The space or gap created between the top block half and the heel will accordingly be of known distance, and the correct size shim selected and employed. The distance can, of course, be verified by actual measurement. The shim ensures that there will be no relative movement between the heel and top block half as the mold is operated.

It will be appreciated that proper spacing between the heel and top block can be accomplished in a continuous as opposed to incremental manner. It will further be appreciated that the heel can be moved relative to the top block half by moving means other than a rotatable cam.

What is claimed is:

1. A method of positioning neck finish components with respect to the front face of a top block half for a blow molding apparatus, comprising:
    mounting neck finish components to said top block half in a non-secure manner,
    positioning a feeler gauge in a space between a rear surface of each of said neck finish components and said top block half such that said feeler gauge engages said rear surfaces of said neck finish components and said top block, thereby positioning said neck finish components with respect to the front face of said top block half,
    removing said feeler gauge,
    securing said neck finish components more tightly to said top block half, and
    causing said molding apparatus to close.

2. A method as described in claim 1 including the steps of opening said molding apparatus and inserting the largest feeler gauge into said space that will fit between said neck finish components and said top block.

3. A method as described in claim 2 including the steps of removing said largest feeler gauge, reducing the tightness of the securement of said neck finish components and said top block half, and inserting a spacer having a slightly larger thickness than said largest feeler gauge into said space.

4. A method as described in claim 1 wherein said top block half includes a substantially vertically extending recess and each of said neck finish components includes a substantially flat rear surface opposing said recess, including the step of inserting said feeler gauge into said recess.

5. A top block assembly comprising:
    a top block half having a front face, a cavity adjoining said front face, a support extending into said cavity, a top surface, and a recess within said top block half and facing said cavity;
    a neck finish component positioned within said cavity such that a rear surface of said neck finish component adjoins said recess to define a substantially vertical slot; and
    a spacer removably positioned within said slot such that said spacer engages said rear surface of said neck finish component and a surface of said top block half bounding said recess.

6. A top block assembly as described in claim 5 wherein said recess adjoins said top surface of said top block half.

7. A top block assembly as described in claim 6 wherein said neck finish component includes a substantially flat rear surface adjoining said recess.

8. A top block assembly as described in claim 7 wherein said spacer includes a substantially flat portion of uniform thickness within said vertical slot.

9. A top block assembly as described in claim 8 wherein said spacer is a feeler gauge.

10. A top block assembly as described in claim 6 including a plurality of neck finish components positioned within said cavity, said neck finish components being supported by said support.

11. A top block assembly as described in claim 10 wherein said top block half includes an integral shelf extending into said cavity, said shelf including an upper surface comprising said support.

12. A top block assembly as described in claim 11 wherein each of said neck finish components includes a substantially flat rear surface adjoining said recess.

13. A top block assembly as described in claim 12 wherein said spacer includes a substantially flat portion of substantially uniform thickness within said recess.

14. A top block half for a blow molding apparatus comprising:
   a top surface;
   a front face adjoining said top surface and including a generally semi-cylindrical front face portion and a pair of generally planar front face portions bordering said semi-cylindrical front face portion;
   a shelf extending from said semi-cylindrical front face portion and having an upper surface for supporting a neck finish component; and
   a recess extending within said semi-cylindrical front face portion and including two opposing walls and a flat surface between said opposing walls, said recess running substantially perpendicular to said top surface and adjoining said top surface.

15. A top block half as described in claim 14 wherein said generally planar front face portions define tonnage pad sections.

16. A top block half as described in claim 15 wherein said recess extends substantially between said top surface and said shelf.

17. A top block half as described in claim 15 wherein said recess has a substantially uniform depth.

18. A top block assembly comprising:
   a top block half having a front face, a top surface, a cavity extending within said front face, and a tail face;
   a heel movably attached to said top block half and having a front surface in opposing relation to said tail face of said top block half; and
   a cam rotatably positioned between said top block half and said heel, said cam including an outer circumference comprised of a plurality of flat surfaces for engagement with said front surface of said heel.

19. A top block assembly as described in claim 18 including a shim adjoining said tail face of said top block half and said front surface of said heel.

20. A top block assembly as described in claim 19 wherein said cam engages said shim.

21. A top block assembly as described in claim 19 wherein said cam engages said front surface of said heel.

22. A top block assembly as described in claim 18 including a plurality of neck finish components mounted to said top block half and positioned within said cavity, a vertical slot extending between said neck finish components and said front face of said top block half, and a spacer removably positioned within said slot and engaging said neck finish components and said front face of said top block half.

23. An assembly for use in blow molding containers, comprising:
   a back plate;
   a main mold half secured to said back plate, said main mold half including a parting face and a first cavity;
   a top block half affixed to said main mold half, said top block half including a front face and a second cavity that communicates with said first cavity;
   a heel positioned between said back plate and said top block half, said heel engaging said back plate; and
   a shim positioned between and engaging said heel and said top block half.

24. The assembly of claim 23 including one or more neck finish components mounted to said top block half and positioned within said second cavity, a slot between said neck finish components and said top block half, and a spacer removably positioned within said slot, said spacer engaging said neck finish components and said top block half.

25. The assembly of claim 24 wherein each of said neck finish components includes a substantially flat surface adjoining said spacer.

26. The assembly of claim 24 including means for moving said heel relative to said top block half.

27. The assembly of claim 26 wherein said means for moving said heel includes means for causing said heel to move in defined increments with respect to said top block half.

28. The assembly of claim 26 wherein said means for moving includes a cam rotatably positioned between said top block half and said heel, said cam including a plurality of flat surfaces for engaging said heel.

29. A method of aligning a front face of a top block half with a parting face of a main mold half mounted to a back plate comprising:
   positioning said top block half and a heel operatively associated with said top block half on said main mold half such that said heel is positioned between said top block half and said back plate;
   moving said heel relative to said top block half such that said heel engages said back plate, said front face of said top block half is aligned with said parting face of said main mold half, and a space between a rear face of said top block half and a front face of said heel is present, and
   positioning a shim into said space such that said shim engages said rear face of said top block half and said front face of said heel.

30. The method of claim 29 including moving said heel relative to said block in one or more discrete increments.

31. The method of claim 30 wherein a cam including a plurality of flat surfaces is positioned between said top block half and said heel, including the step of rotating said cam such that successive ones of said flat surfaces engage said heel and move said heel relative to said top block in said discrete increments.

32. The method of claim 29 including the steps of mounting neck finish components to said top block half and inserting a feeler gauge between said neck finish components and said top block half.

33. A method of positioning neck finish components with respect to the front face of a top block half for a blow molding apparatus, said top block half including a substantially vertically extending recess, comprising:
   mounting neck finish components having substantially flat rear surfaces to said top block half in a non-secure manner, and
   positioning a feeler gauge into said recess between said substantially flat rear surface of each of said neck finish components and said top block half such that said feeler gauge engages said substantially flat rear surfaces of said neck finish components and said top block half, thereby positioning said neck finish components with respect to the front face of said top block half.

* * * * *